Sept. 23, 1947. J. A. KING 2,427,913
MULTIPLE BOBBIN GAUGE
Filed Aug. 27, 1945 8 Sheets-Sheet 1
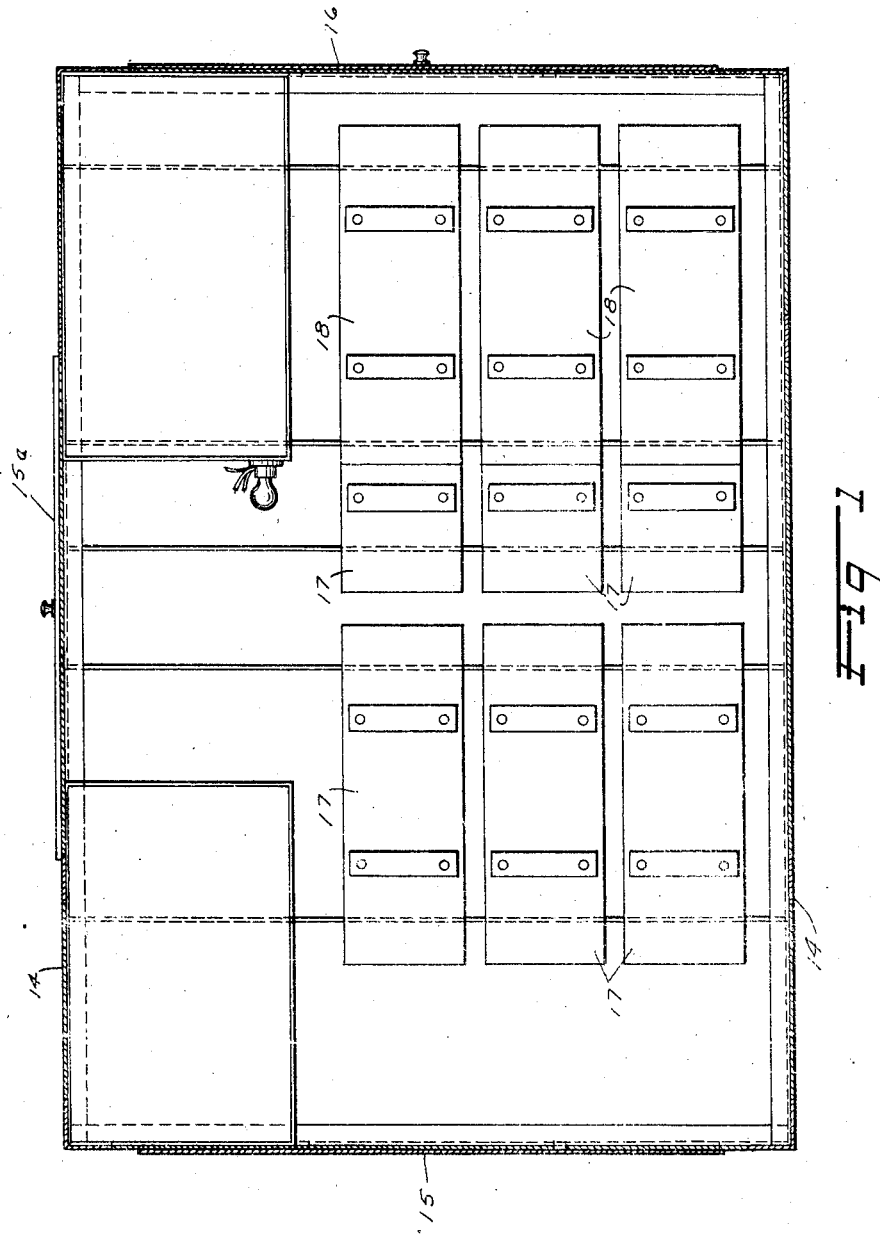
Inventor
J. A. KING
By
Attorney
Lester S. Sargent Sept. 23, 1947.  J. A. KING  2,427,913
MULTIPLE BOBBIN GAUGE
Filed Aug. 27, 1945  8 Sheets-Sheet 2
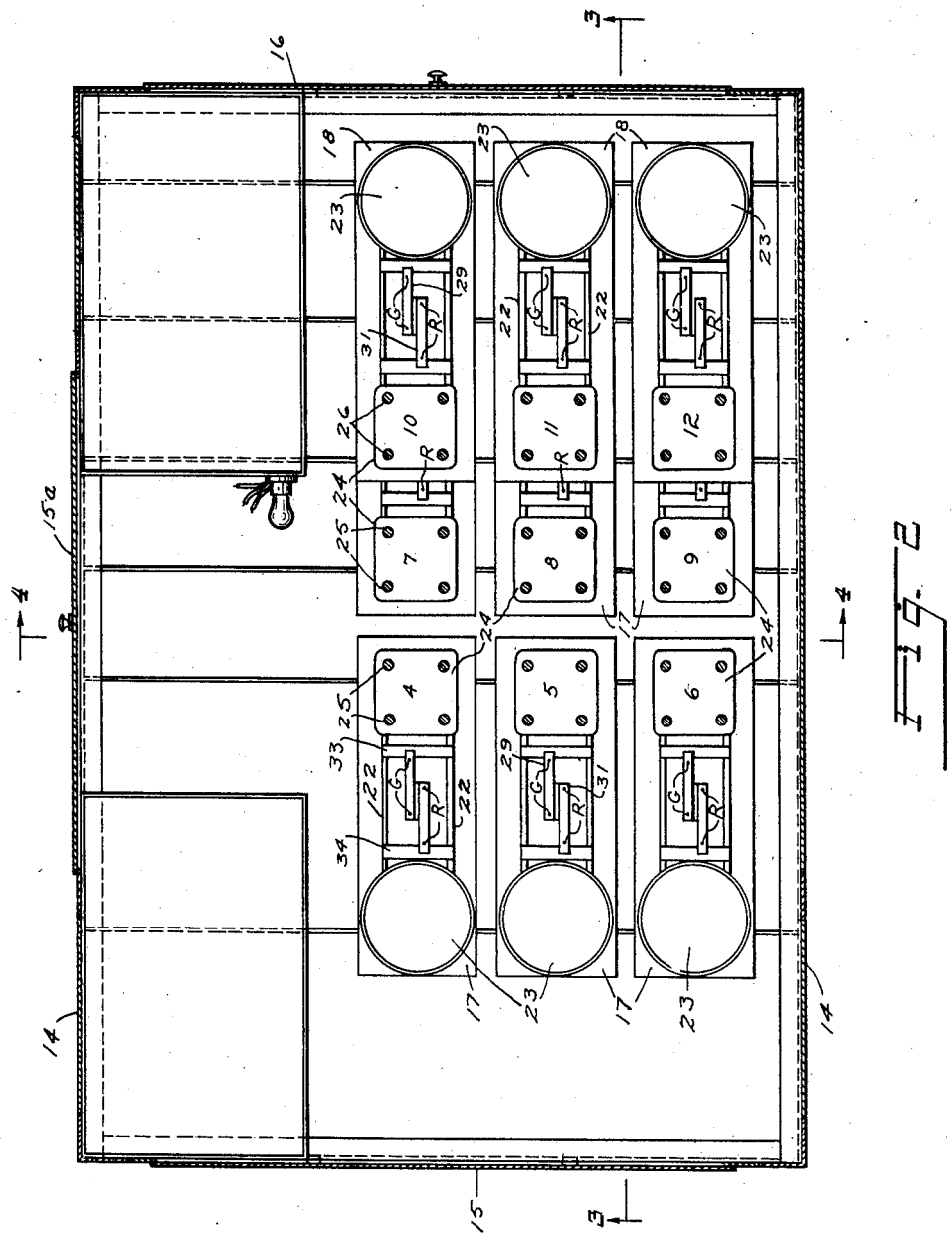
Inventor
J. A. KING
By
Attorney
Lester L. Sargent

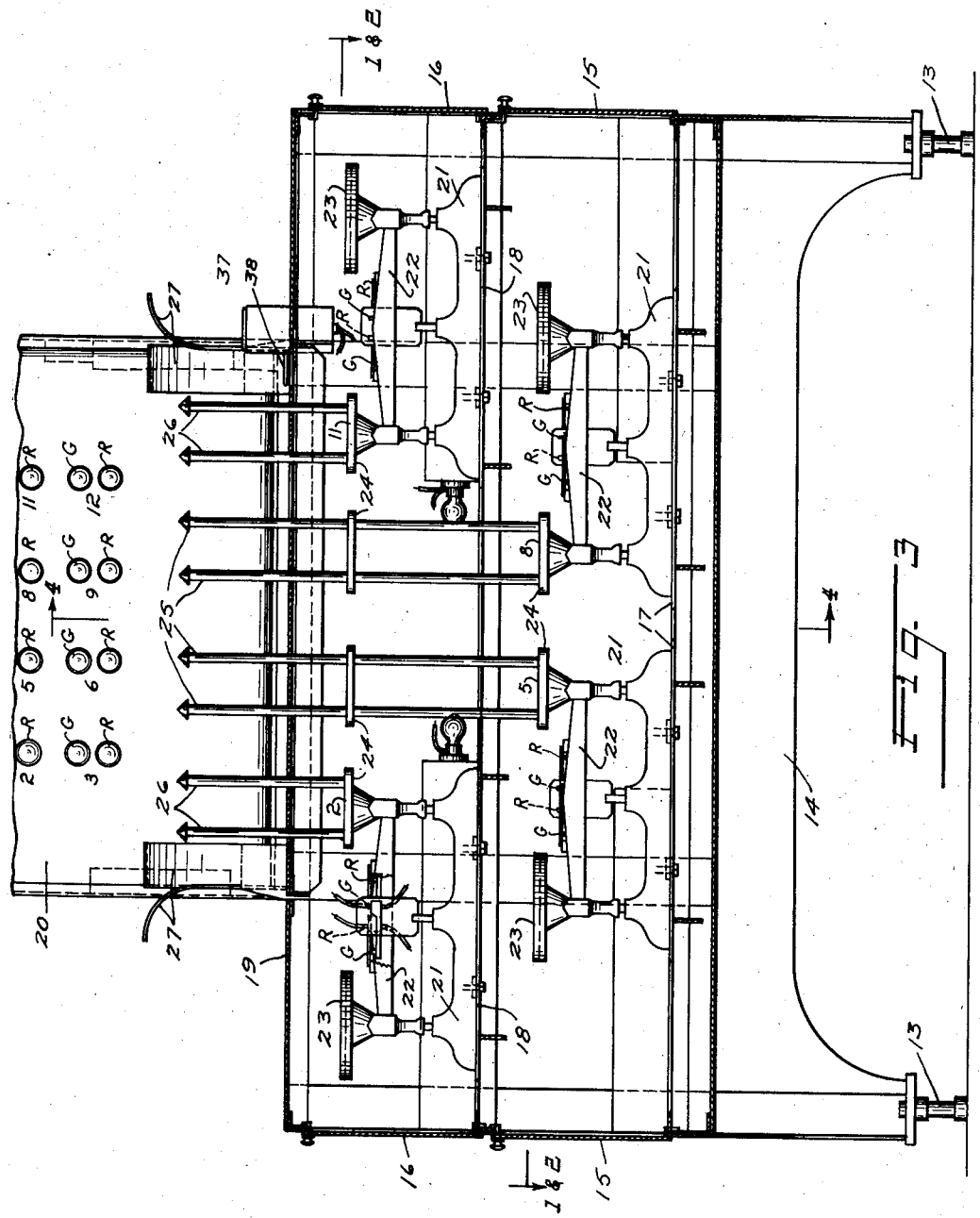

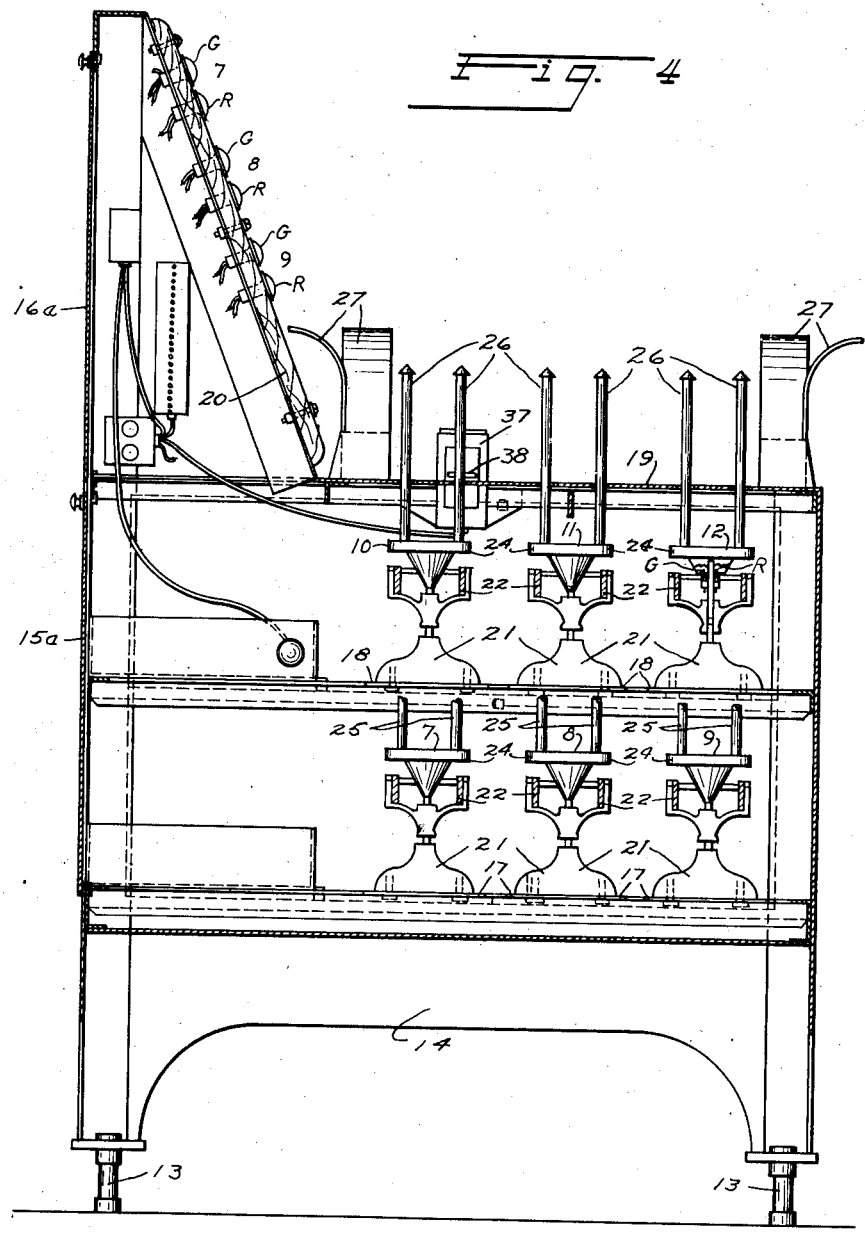

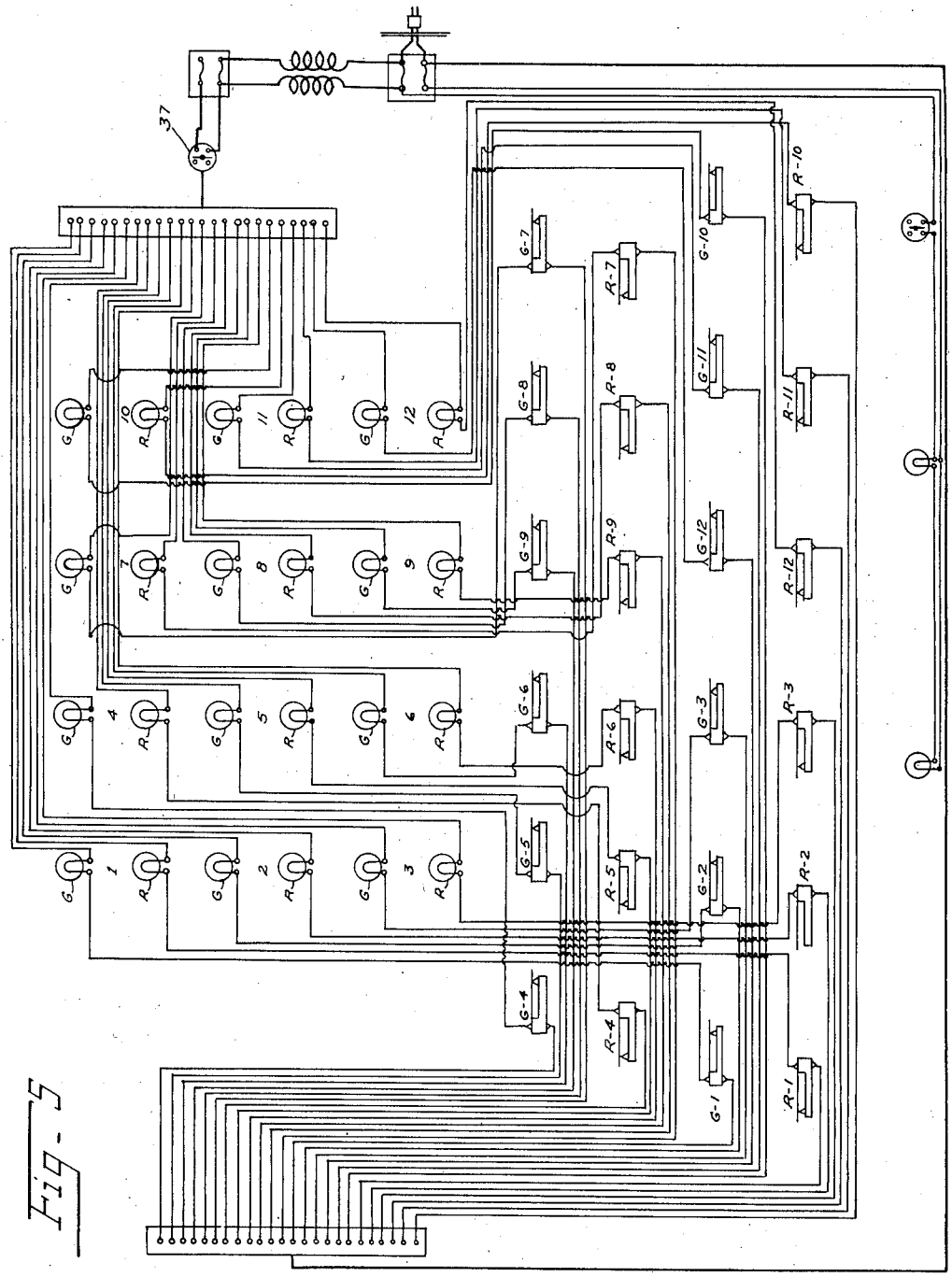

Sept. 23, 1947. J. A. KING 2,427,913
MULTIPLE BOBBIN GAUGE
Filed Aug. 27, 1945 8 Sheets-Sheet 6
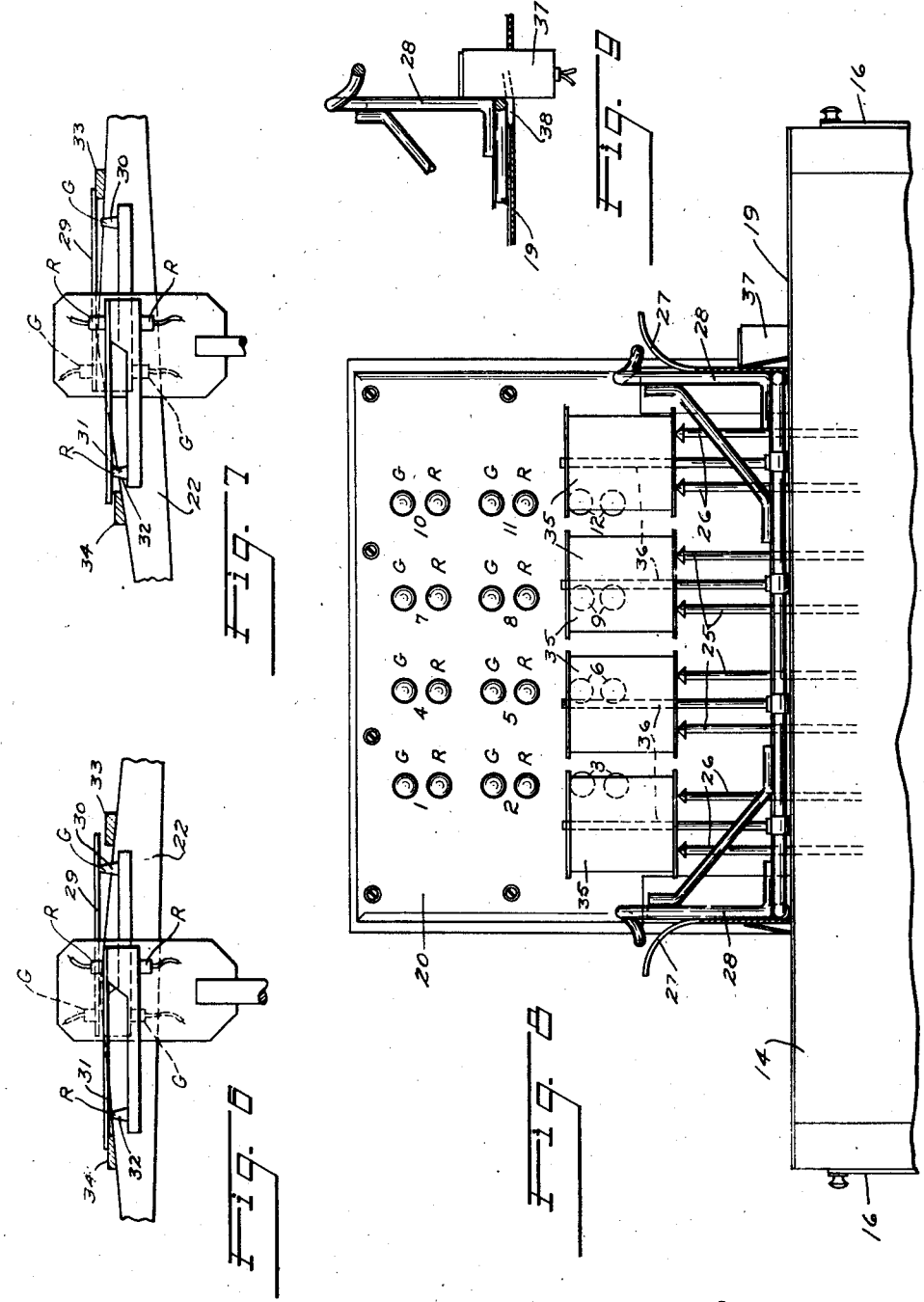
Inventor
J. A. KING
By
Attorney
Lester L. Sargent

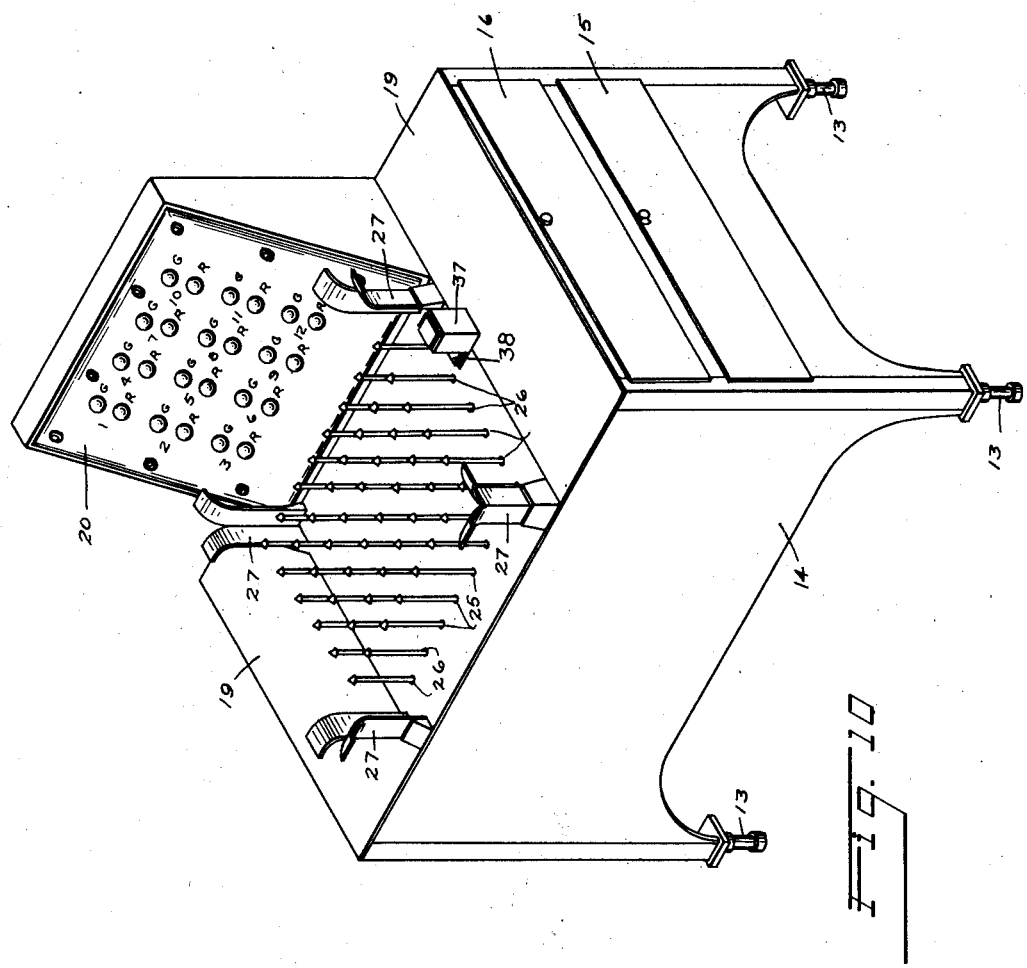

Sept. 23, 1947.   J. A. KING   2,427,913
MULTIPLE BOBBIN GAUGE
Filed Aug. 27, 1945   8 Sheets-Sheet 8

Inventor
J. A. KING
By Lester L. Sargent
Attorney

Patented Sept. 23, 1947

2,427,913

UNITED STATES PATENT OFFICE 2,427,913

MULTIPLE BOBBIN GAUGE

James A. King, Greensboro, N. C.

Application August 27, 1945, Serial No. 612,919

4 Claims. (Cl. 177—311)

The object of my invention is to provide a multiple bobbin gauge comprising a cabinet containing an assembly of small scales so arranged as to allow the weighing of bobbins individually to determine whether or not each bobbin has a sufficient amount of thread, without its being necessary for the operator to remove the bobbin from the tray or wire frame.

It is also an object of my invention to provide means whereby the frame will fall in the same place for each weighing operation. It is also an object of my invention to provide a novel arrangement of signal lights for signalling whether or not each of the bobbins contains the required quantity of thread. It is also an object of my invention to provide a novel combination and arrangement of parts hereinafter described and illustrated in the accompanying drawings in which:

Figure 1 is a plan view of the invention on line 1—1 of Fig. 3, showing structure on which scales are mounted;

Fig. 2 is a plan view on section line 1—1 of Fig. 3 showing the structure and scales;

Fig. 3 is a vertical section on line 3—3 of Fig. 2 showing the scales and internal structure of the cabinet.

Fig. 4 is a vertical section taken on line 4—4 of Figs. 2 and 3, showing internal structure, and the arrangement of the scales;

Fig. 5 is an electric wiring diagram showing the entire electrical wiring system of the machine;

Fig. 6 is a detail side elevation of one of the electrical contact mechanisms on one of the scales, showing the contact points in lighting position for the red light;

Fig. 7 is a similar view to Fig. 6, except that it shows the contact point in lighting position for the green light;

Fig. 8 is a side elevation showing the bobbin tray showing the bobbins supported in weighing position on the fingers of the machine;

Fig. 9 is a detail section of a portion of the tray showing how the bobbin tray actuates the trigger in the switch box;

Fig. 10 is an isometric perspective showing the general arrangement and exterior features of the machine.

Figure 11:
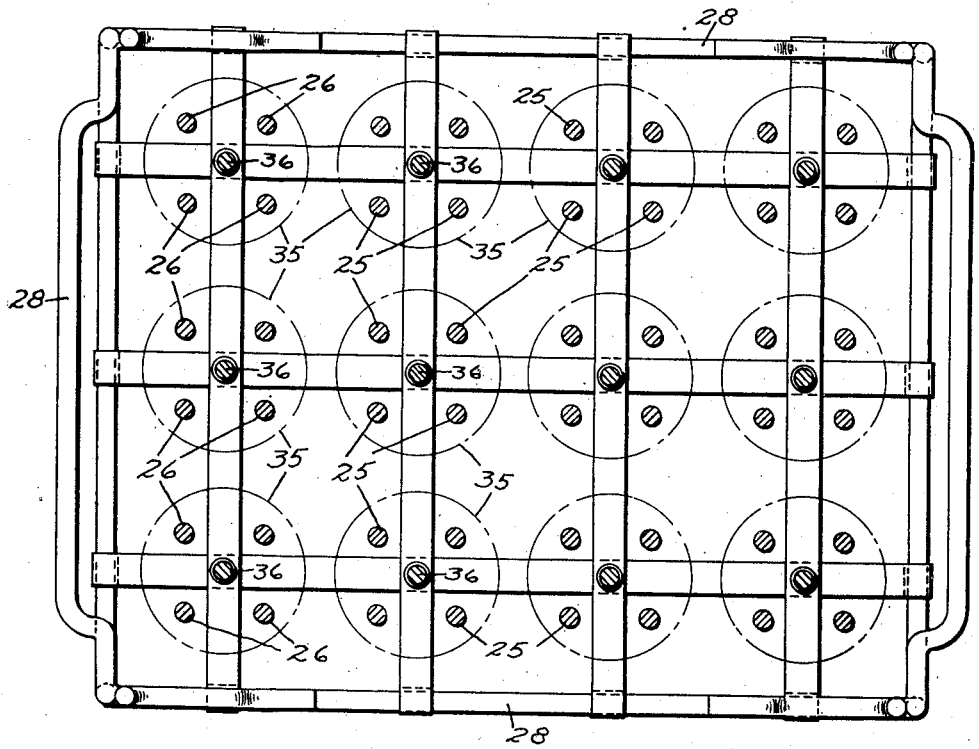
Fig. 11 is a horizontal section showing in top elevation how the trays, picks, fingers and bobbins are disposed.

Referring to the accompanying drawings, I provide a cabinet 14 mounted on legs 13 and having at each end a lower door 15 and an upper door 16. The cabinet is provided also with doors 15a and 16a at the back of the cabinet to enable the operator to readily gain access to the interior of the cabinet to change the amount of weight on the scale platform or to permit of making repairs to the device if necessary. The cabinet is provided with a lower deck or platform 17, a middle deck or platform 18 and a top deck or platform 19. In some instances it may be necessary to add another or fourth deck to provide space for scales to weigh additional bobbins.

Above the top deck 19 is an upstanding control board 20 on which are mounted a series of signal lights arranged in pairs with one red light and one green light in each pair. These pairs of signal lights are numbered 1 to 12 inclusive, as shown in Fig. 8, and are electrically connected to the scale levers of the several scales positioned within the cabinet.

Each scale has the usual base 21, a scale beam 22, which carries a weight platform 23 at one end and a bobbin or commodity platform 24 at the other end. The commodity platforms of the scales on the lower deck 17 have long fingers 25, while the commodity platforms of the scales on the middle deck 18 have relatively shorter fingers 26. The fingers 25 and 26 each project a like distance above the top deck or platform of the cabinet, as shown in Fig. 3. Four fingers engage the bottom of a bobbin to raise it.

On the upper deck 19 of the cabinet, arranged at each corner, are guides 27 for holding in position on the machine the wire frame or wire tray 28 carrying the plurality of bobbins 35—twelve being shown. The bobbins 35 are thereby placed simultaneously on all of the upstanding fingers 25 and 26 for the purpose of weighing said bobbins 35. Each quartet of fingers has a small connecting or bracing element. The bobbins rest while they are being weighed on the ends of the fingers 25 and 26.

The purpose of the device is to allow weighing of bobbins individually to determine whether or not each bobbin has a sufficient amount of thread wound on it, without it being necessary for the operator to remove the bobbin from the wire tray. In order that each bobbin may rest in the same location each time for the purpose of being weighed, four guides 27 are provided at the four corners of the portion of the top deck through which the fingers project, as shown in Fig. 10. By having the tray rest in the same place for each weighing operation, it forces the bobbins to go into identical places (twelve being shown) each time, because they are held in places on the wire tray by spikes 36 (twelve being shown). The four fingers 25 or 26 extend from the commodity platform of each of the scales (twelve being shown) located in the cabinet through the open top of the cabinet to support or lift the bobbins 35 up to within one-eighth inch of the top of the spike 36 when the bobbins are being weighed. Thereby the friction of the bobbin on the spike is reduced to a minimum. Yet the spike is still in the central channel of the bobbin so that when the operator lifts the frame out of the cabinet and its guides 27, each bobbin falls back into place guided by the same spike 36 of the wire tray.

Attached to and rising above the back of the cabinet is a control board 20 which contains 24 lights, or two for each scale and its corresponding bobbin. One of each pair of lights is green and the other one is red. These lights are wired to the switches mounted on the scale beams as illustrated in Figs. 6 and 7. If there is a sufficient (or more) quantity of thread on any particular bobbin, the contact member 29, shown in Fig. 6, will engage contact point 30 as shown in Fig. 6, and illuminate the green light of the pair of lights for that particular scale and bobbin. If there is not a sufficient quantity of thread on that particular bobbin the scale will tilt into the position shown in Fig. 7, and contact member 31 will engage contact point 32 and close the red light circuit so that the red light will be lit and the green light will not.

If the weight on the bobbin is exactly in accordance with the pre-determined amount required both the red and the green lights of that particular set will be illuminated.

Each set of two lights is spaced from the next adjacent set and is positioned in the same relative position as the corresponding bobbin and the scale to which it is wired so that the operator can immediately tell by the lights which bobbin does not have enough thread.

Each pilot light has a ribbon-type platinum point contact switch which makes contact or breaks contact in accordance with the movement of the scale beam 22.

Also, on this cabinet, there is a master pilot light switch 37 having a switch lever 38 engaged by wire tray 28. Pilot light switch 37 turns on automatically when the bobbin tray is put into place and is cut off when the bobbin tray is removed.

The operator can set the scales for any predetermined weight he may desire by placing on the weight platform a combination of loose weights that will meet the required weight of the bobbin plus the desired amount of thread to be run onto the bobbin.

In place of the master switch 37 I may provide a portable switch positioned on the floor so that it may be turned on and off by a conventional foot-pedal and provide a new fuse box and transformer as shown in Fig. 5, diagrammatically.

What I claim is:

1. In a multiple bobbin gauge, the combination of a cabinet, the cabinet having a plurality of decks, scales on each deck of the cabinet, doors at the back of the cabinet to enable the operator to gain access to the scales within the cabinet, each of the scales having a weight platform and a commodity platform, fingers carried by each commodity platform and extending up through the decks of the cabinet to receive and center the bobbins on the scales, a control board carrying a series of pairs of electric lights, one of the lights being red and one green in each pair, wiring from the lights of each pair to a correspondingly positioned scale and bobbin, and electric switches on each scale beam arranged to be operated by the weight of the bobbin on the scale to illuminate either a green or a red light according to whether the bobbin's weight indicates that it has a sufficient amount of thread or an insufficient amount of thread.

2. In combination with the mechanism defined in claim 1, a wire tray adapted to be seated on the cabinet and to hold the desired plurality of bobbins of like number to the number or scales in the cabinet, the tray having upstanding spikes on which the bobbins are positioned, whereby to enter the several bobbins over the bobbin-engaging means carried by each commodity platform.

3. In combination with the mechanism defined in claim 1, a wire tray adapted to be seated on the cabinet and to hold the desired plurality of bobbins of like number to the number of scales in the cabinet, the tray having upstanding spikes on which the bobbins are positioned, whereby to center the several bobbins over the bobbin-engaging means carried by each commodity platform, and means whereby the bobbins are lifted from the tray onto the fingers, guides on the upper deck of the cabinet positioned to engage the four corners of the wire tray and guide same into proper position to have the bobbins disposed directly over the bobbin-engaging means which support the bobbins while they are being weighed.

4. In combination with the mechanism defined in claim 1, a wire tray adapted to carry a plurality of bobbins corresponding with the number of scales, said tray having upstanding spikes arranged to properly position the bobbins over the aforesaid bobbin-engaging means carried by the scales, a master pilot light switch adapted to be engaged by the wire tray to turn on the light switch automatically when the bobbin tray is put in place on the cabinet and to cut it off when the bobbin tray is removed.

JAMES A. KING.

REFERENCES CITED

The following references are of record in the file of this patent:

UNITED STATES PATENTS

| Number | Name | Date |
|---|---|---|
| 1,845,557 | Rees | Feb. 16, 1932 |
| 1,936,828 | Clement et al. | Nov. 28, 1933 |
| 2,251,825 | Fitzpatrick et al. | Aug. 5, 1941 |

FOREIGN PATENTS

| Number | Country | Date |
|---|---|---|
| 522,982 | Germany | Aug. 11, 1929 |